(12) United States Patent
Kobayashi et al.

(10) Patent No.: US 7,914,931 B2
(45) Date of Patent: *Mar. 29, 2011

(54) SEPARATOR FOR RECHARGEABLE LITHIUM BATTERY, RECHARGEABLE LITHIUM BATTERY INCLUDING THE SAME, AND METHOD FOR PREPARING RECHARGEABLE LITHIUM BATTERY

(75) Inventors: Naoya Kobayashi, Yokohama (JP); Yong-Beom Lee, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1058 days.

This patent is subject to a terminal disclaimer.

(21) Appl. No.: 11/642,957

(22) Filed: Dec. 21, 2006

(65) Prior Publication Data

US 2007/0178375 A1 Aug. 2, 2007

(30) Foreign Application Priority Data

Dec. 21, 2005 (JP) ................................. 2005-367638
Dec. 21, 2006 (KR) ........................ 10-2006-0131842

(51) Int. Cl.
*H01M 2/16* (2006.01)

(52) U.S. Cl. ...................................... 429/248; 29/623.5

(58) Field of Classification Search .......... 429/122–347; 29/623.1–623.5
See application file for complete search history.

(56) References Cited

U.S. PATENT DOCUMENTS

| | | | |
|---|---|---|---|
| 4,970,559 A * | 11/1990 | Miyabayashi | ................. 399/324 |
| 5,344,726 A | 9/1994 | Tanaka et al. | |
| 5,478,672 A | 12/1995 | Mitate | |
| 5,885,733 A | 3/1999 | Ohsawa et al. | |
| 5,888,430 A | 3/1999 | Wakayama et al. | |
| 6,124,062 A | 9/2000 | Horie et al. | |
| 6,436,577 B1 | 8/2002 | Kida et al. | |
| 6,541,156 B1 | 4/2003 | Fuse et al. | |
| 6,733,922 B2 | 5/2004 | Matsubara et al. | |
| 6,783,897 B2 | 8/2004 | Kang et al. | |
| 6,872,493 B2 | 3/2005 | Yamada et al. | |
| 6,884,270 B2 | 4/2005 | Yoshino et al. | |
| 6,887,619 B2 | 5/2005 | West et al. | |
| 7,351,501 B2 | 4/2008 | Jung et al. | |
| 7,459,239 B2 | 12/2008 | Kashida et al. | |
| 7,588,859 B1 | 9/2009 | Oh et al. | |
| 7,618,678 B2 | 11/2009 | Mao et al. | |
| 2002/0028388 A1 * | 3/2002 | Lee | ............................... 429/303 |

(Continued)

FOREIGN PATENT DOCUMENTS

EP 0 581 296 2/1994

(Continued)

OTHER PUBLICATIONS

Machine Translation of JP H10-154499 to Yasuhisa et al. originally published Jun. 1998.*

(Continued)

*Primary Examiner* — Basia Ridley
*Assistant Examiner* — Jonathan G Leong
(74) *Attorney, Agent, or Firm* — Robert E. Bushnell, Esq.

(57) ABSTRACT

A separator for a rechargeable lithium battery, a rechargeable lithium battery including the same, and a method of manufacturing a rechargeable lithium battery. The separator includes a separating substrate; and an antistatic agent coated on the separating substrate.

18 Claims, 3 Drawing Sheets

U.S. PATENT DOCUMENTS

| | | | |
|---|---|---|---|
| 2002/0160256 A1 | 10/2002 | Kami et al. | |
| 2004/0170816 A1 | 9/2004 | Watanabe et al. | |
| 2004/0197668 A1* | 10/2004 | Jung et al. | 429/330 |
| 2004/0214090 A1* | 10/2004 | West et al. | 429/311 |
| 2005/0170254 A1 | 8/2005 | West et al. | |
| 2006/0008706 A1* | 1/2006 | Yamaguchi et al. | 429/313 |
| 2007/0122717 A1* | 5/2007 | Shimizu et al. | 429/313 |
| 2007/0148543 A1* | 6/2007 | Takamuku et al. | 429/217 |

FOREIGN PATENT DOCUMENTS

| | | |
|---|---|---|
| JP | 05-286763 | 11/1993 |
| JP | 06-096759 | 4/1994 |
| JP | 08-078053 | 3/1996 |
| JP | 10-154499 | 6/1998 |
| JP | 11-213042 | 8/1999 |
| JP | 11-214032 | 8/1999 |
| JP | 11-273732 | 10/1999 |
| JP | 11-329392 | 11/1999 |
| JP | 2000-058123 | 2/2000 |
| JP | 2002-255529 | 9/2002 |
| JP | 2003-142157 | 5/2003 |
| JP | 2003-197030 | 7/2003 |
| JP | 2003-229019 | 8/2003 |
| JP | 2005-071772 | 3/2005 |
| KR | 2000-0076049 | 12/2000 |
| KR | 10-2001-0024400 | 3/2001 |
| KR | 10-2004-0065152 | 7/2004 |
| KR | 10-2005-0052217 | 6/2005 |
| KR | 10-2006-0048753 | 5/2006 |
| KR | 10-2007-0010373 | 1/2007 |
| WO | WO 03083974 A1 * | 10/2003 |

OTHER PUBLICATIONS

The Office Action (Paper No. 20100314) mailed on Mar. 25, 2010 of the related U.S. Appl. No. 11/599,620.

The Office Action (Paper No. 20091209) mailed on Dec. 28, 2009 of the related U.S. Appl. No. 11/599,620.

The Office Action (Paper No. 20090630) mailed on Jul. 2, 2009 of the related Application No. 11/599,620.

The Office Action (Paper No. 20100525) mailed on Jun. 10, 2010 of the related U.S. Appl. No. 11/614,374.

The Office Action (Paper No. 20100904) mailed on Sep. 13, 2010 of the related U.S. Appl. No. 11/177,919.

The Office Action (Paper No. 20091207) mailed on Dec. 23, 2009 of the related U.S. Appl. No. 11/177,919.

The Office Action (Paper No. 20090630) mailed on Jul. 6, 2009 of the related U.S. Appl. No. 11/177,919.

* cited by examiner

SEPARATOR FOR RECHARGEABLE LITHIUM BATTERY, RECHARGEABLE LITHIUM BATTERY INCLUDING THE SAME, AND METHOD FOR PREPARING RECHARGEABLE LITHIUM BATTERY

CROSS-REFERENCES TO RELATED APPLICATIONS

This application claims priority to and the benefit of Japanese Application No. 2005-367638 filed with the Japan Patent Office on 21 Dec. 2005, and Korean Patent Application No. 10-2006-0131842 filed in the Korean Intellectual Property Office on 21 Dec. 2006, the entire contents of which are incorporated herein by reference.

BACKGROUND OF THE INVENTION (a) Field of the Invention

The present invention relates to a separator, a rechargeable lithium battery, and a method of manufacturing a rechargeable lithium battery. More particularly, the present invention relates to a separator having excellent antistatic characteristics and a rechargeable lithium battery including the same.

(b) Description of the Related Art

Rechargeable lithium batteries have become overwhelmingly used as power sources for electronic devices such as mobile phones, digital cameras, digital camcorders, notebook computers, and the like. A conventional rechargeable lithium battery includes a positive electrode including a positive active material, a negative electrode including a negative active material, a separator interposed between the positive and negative electrodes, and a non-aqueous electrolyte. A separator included in a lithium battery has been known to be formed of a polymer porous film (see, for example, Japanese Patent laid-open No. 1999-329392 entitled NONAQUEOUS ELECTROLYTE SEPARATOR AND MANUFACTURE THEREOF, filed on the 5 Nov. 1998 by Ishizaki Satoru and Matsushita Kiichiro).

Since a conventional separator easily generates static electricity, it may stick to a worker or to a machine during manufacture of a rechargeable lithium battery including the separator thereby, causing a handling problem. In addition, since the separator easily causes static electricity, impurities or dust may be absorbed into the battery. In other words, the impurities may be produced from an active material included in a rechargeable lithium battery during the process of manufacturing the rechargeable lithium battery, and dust which may exist in the manufacturing environment, may then be absorbed in the separator. The impurities or dust absorbed in the separator during the manufacturing process could easily cause a short cut of a rechargeable lithium battery.

SUMMARY OF THE INVENTION

It is therefore, an object of the present invention to provide an improved rechargeable lithium battery and an improved process for manufacturing rechargeable lithium batteries.

It is another object to provide a rechargeable lithium battery with a structure that is less amenable to introduction of impurities and dust during its manufacture.

It is a further object to provide a process for manufacturing rechargeable lithium batteries that reduces the likelihood of introduction of impurities and dust into a battery during its manufacture.

One embodiment of the present invention provides a separator having excellent antistatic characteristics.

Another embodiment of the present invention provides a rechargeable lithium battery that does not incur circuit-short attributable to impurities or dust adsorbed on a separator, and thus exhibit excellent reliability.

Yet another embodiment of the present invention provides a method for manufacturing a rechargeable lithium battery having excellent reliability.

According to an embodiment of the present invention, provided is a separator for a rechargeable lithium battery including a separating substrate; and an antistatic agent coated on the separating substrate.

The antistatic agent can be polyether-modified silicone oil selected from the group consisting of the compounds represented by the following formulas 1 to 5 and combinations thereof.

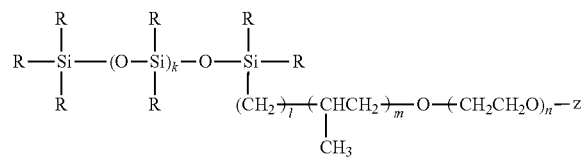

Formula 1

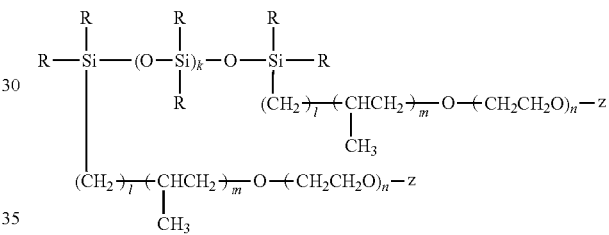

Formula 2

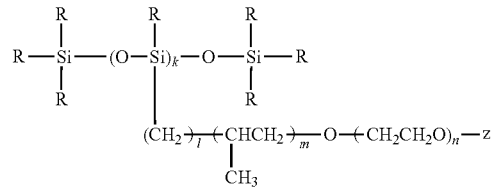

Formula 3

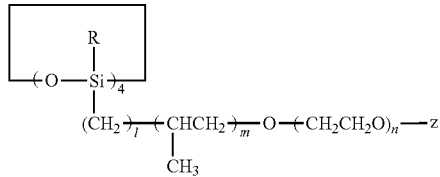

Formula 4

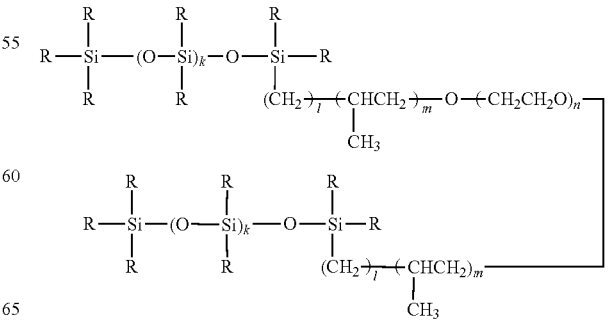

Formula 5 where, in the above formulas 1 to 5, k ranges from 1 to 9, l ranges 0 to 3, m ranges from 0 to 1, n ranges from 1 to 2, R is either of $CH_3$ or $C_6H_5$, and z is either of $CH_3$ or $C_2H_5$.

The separating substrate may be a polymer porous film.

According to another embodiment, provided is a rechargeable lithium battery, including a positive electrode including a positive active material; a negative electrode including a negative active material; a separator interposed between the positive and negative electrodes; and a non-aqueous electrolyte. The separator is coated with an antistatic agent.

The antistatic agent can be polyether-modified silicone oil selected from the group consisting of the compounds represented by the following formulas 1 to 5 and combinations thereof.

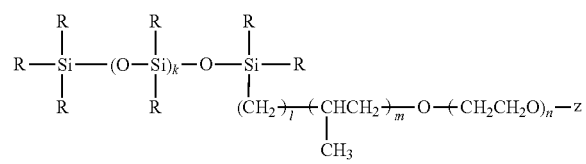

Formula 1

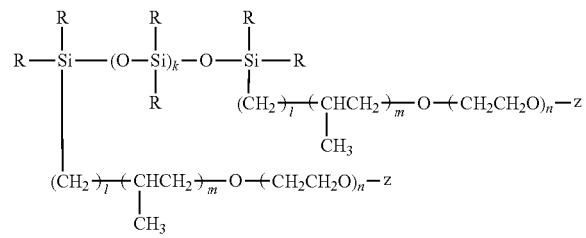

Formula 2

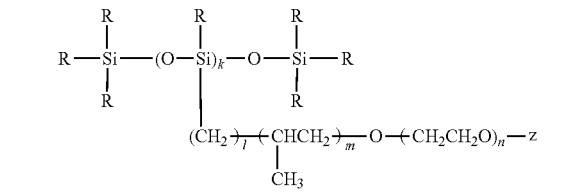

Formula 3

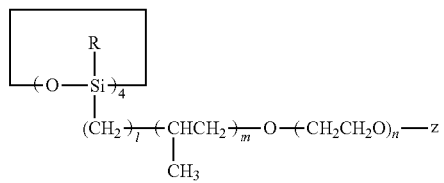

Formula 4

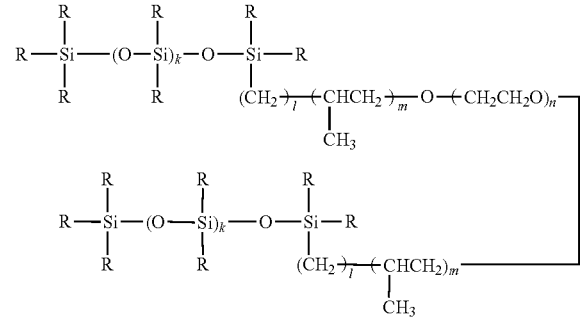

Formula 5 where, in the above formulas 1 to 5, k ranges from 1 to 9, l ranges 0 to 3, m ranges from 0 to 1, n ranges from 1 to 2, R is either of $CH_3$ or $C_6H_5$, and z is either of $CH_3$ or $C_2H_5$.

According to yet another embodiment, provided is a method of manufacturing a rechargeable lithium battery that includes providing a positive electrode including a positive active material, a negative electrode including a negative active material, a separating substrate, and a non-aqueous electrolyte; preparing a separator by coating the separating substrate with an antistatic agent; interposing the separator between the positive and negative electrodes; and injecting the non-aqueous electrolyte.

The separator may be fabricated by impregnating the antistatic agent in the separating substrate.

The antistatic agent is polyether-modified silicone oil selected from the group consisting of the compounds represented by the following formulas 1 to 5 and combinations thereof:

The separator includes an antistatic agent coated thereon and thereby, has excellent antistatic characteristics. Accordingly, impurities or dust is not adsorbed in the separator. In addition, the separator does not stick to a manufacture machine, and therefore, it is easy to handle.

The rechargeable lithium battery including the separator coated with antistatic agent does not incur short-circuit by impurities or dust adsorbed in the separator and therefore, shows improved cell reliability.

In the manufacturing process of the rechargeable lithium battery, the separator coated with antistatic agent does not stick to a manufacture machine. Therefore, the separator is easy to handle, and a rechargeable lithium battery can be efficiently fabricated.

According to another embodiment, provided is a rechargeable lithium battery including a positive electrode including a positive active material; a negative electrode including a negative active material; a separator interposed between the positive and negative electrodes and coated with an antistatic agent; and non-aqueous electrolyte.

DETAILED DESCRIPTION OF THE INVENTION

An exemplary embodiment of the present invention will hereinafter be described in detail with reference to the accompanying drawings.

Figure 1:
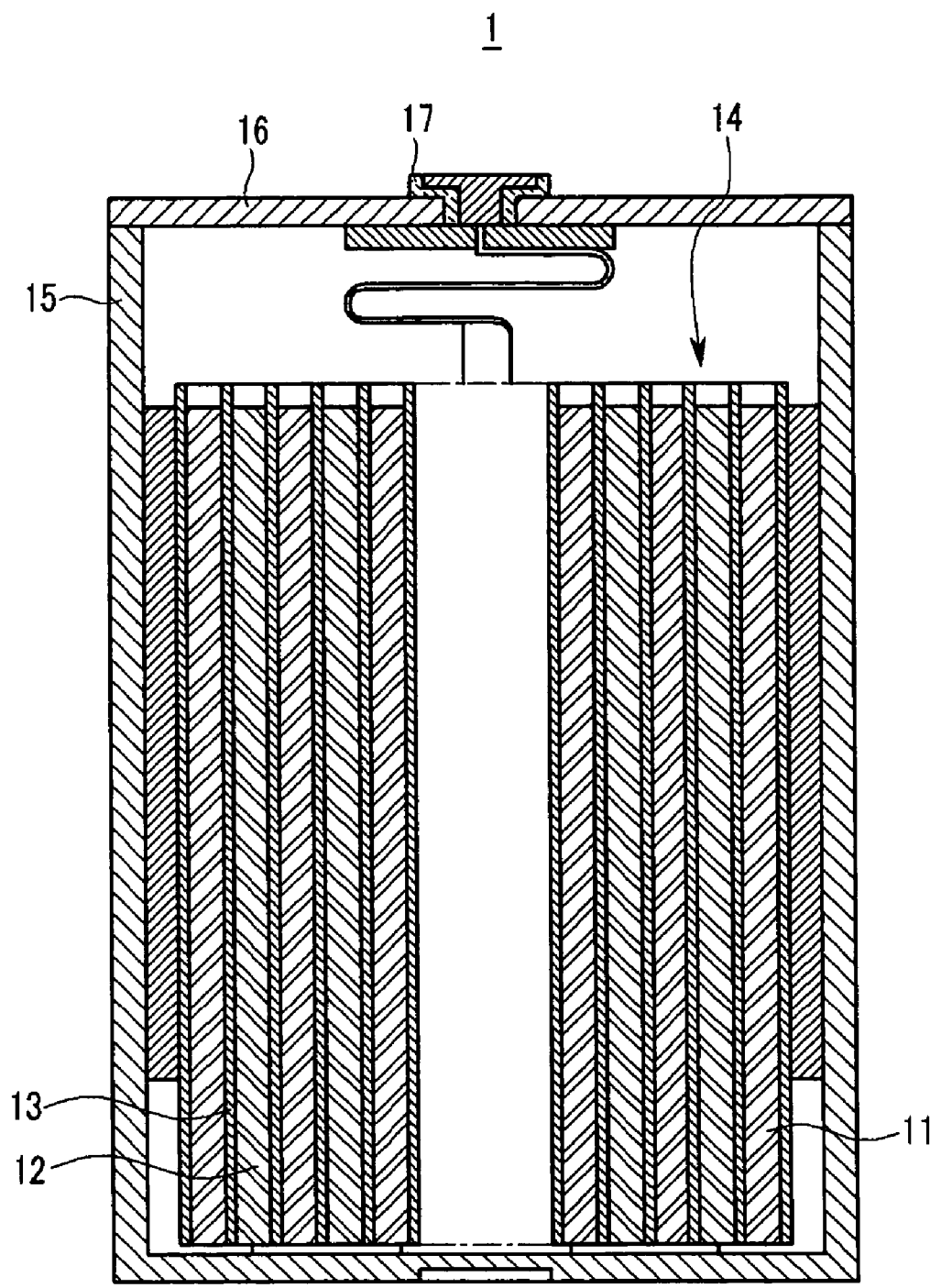
FIG. 1 is a schematic cross sectional perspective illustrating a rechargeable lithium battery according to one embodiment of the present invention.

FIG. 1 is a schematic cross sectional perspective illustrating a rechargeable lithium battery according to one embodiment of the present invention.

Referring to FIG. 1, a rechargeable lithium battery 1 according to one embodiment is fabricated by placing an electrode assembly 14 including a positive electrode 11, a negative electrode 12, and a separator 13 interposed between the positive electrode 11 and the negative electrode 12 inside a case 15, then, injecting an electrolyte through the upper part of the case 15, and sealing the case 15 by a cap plate 16 and a gasket 17.

Separator

According to one embodiment of the present invention, a separator separates positive and negative electrodes of a rechargeable lithium battery. The separator includes a polymer porous film composed of polyolefin such as polypropylene, polyethylene, and so on, and polyether-modified silicone oil coated on the polymer porous film. The polyether modified silicone oil functions an antistatic agent and may be selected from the group consisting of a compound represented by the foregoing formulas 1 to 5 and combinations thereof.

The polymer porous film used as a separating substrate is formed of a 10 to 30 μm-thick polyolefin and has plenty of minute through-holes on the surface. When the polymer porous film is formed of polyolefin, it may include a single structure of polypropylene or triple structures of polypropylene/polyethylene/polypropylene.

In addition, when the separator is coated with polyether-modified silicone oil, the polyether-modified silicone oil may be soaked into the separator itself. Specifically, polyether-modified silicone oil may be coated on the surface of the polymer porous film or charged in the minute holes of the polymer porous film or both.

The polyether-modified silicone oil is selected from the group consisting of the compounds represented by the following formulas 1 to 5 and combinations thereof. The polyether-modified silicone oil represented by the above formulas 1 to 5 includes one or two polyether chain $[(-CH_3)_l-(CH(CH_3)CH_2)_m-O-(C_2H_4O)_n-z)$ or $(-(CH_2)_l-(CH(CH_3)CH_2)_m-O-(C_2H_4O)_n-(CH_2CH(CH_3CH))_m-(CH_2)_l)-]$ linked to a linear poly siloxane chain $(SiR_2-O-(SiR_2O-)_k-SiR_2)$ or a cyclic poly siloxane. The polyether-modified silicone oil represented by the above formulas 1 to 5 has high thermal stability due to a linear or cyclic poly siloxane chain.

In the above formulas 1 to 5, k ranges from 1 to 9, l ranges 0 to 3, m ranges from 0 to 1, n ranges from 1 to 2, R is either of $CH_3$ or $C_6H_5$, and z is either of $CH_3$ or $C_2H_5$.

When k is more than 9, it may improve thermal stability but also, increase viscosity. So, when it is manufactured into a battery, an electrolyte solution may not be permeated thereinto. However, when k is less than 1, silicone oil may be easily decomposed.

In addition, when l is more than 3, it may increase viscosity. So, when it is manufacture into a battery, an electrolyte solution may not be permeated thereinto.

When m is more than 1, a polyether chain may get longer, increasing viscosity. So, when the separator is manufactured into a battery, an electrolyte solution may not be permeated thereinto.

When n is less than 1, silicone oil may be easily decomposed. When n is more than 2, it may increase viscosity. So, when the separator is manufactured into a battery, an electrolyte solution may not be permeated thereinto.

When R is either of $CH_3$ or $C_6H_5$, and z is either of $CH_3$ or $C_2H_5$, the polyether modified silicone oil can be easily synthesized.

On the other hand, the amount of polyether-modified silicone oil coated on the polymer porous film may be regulated depending on thickness or porosity of the polymer porous film. For example, when the polymer porous film is a 1 $m^2$-wide film having a thickness ranging from 10 to 30 μm and a porosity ranging 30 to 50%, the polyether modified silicone oil may be added in an amount of 0.3 g to 5.0 g. According to another embodiment, the polyether modified silicone oil may be added in an amount of 1.0 g to 5.0 g.

When the amount of polyether-modified silicone oil is coated in an amount of less than 0.3 g per 1 $m^2$ of a polymer porous film, it may not have sufficient effects for preventing static electricity of the polymer porous film. When in an amount of more than 5.0 g per 1 $m^2$ of a polymer porous film, minute pores on a separator are filled with the silicone oil, interfering with movement of lithium ions and thereby, increasing battery impedance, and deteriorating charge and discharge characteristics.

The polyether-modified silicone oil can be coated on a polymer porous film in any conventional method. In addition, the polyether-modified silicone oil can be impregnated in a polymer porous film by dipping the polymer porous film in the polyether-modified silicone oil and dried.

Herein, a polymer porous film can be dipped in a solution including the polyether-modified silicone oil instead of the polyether-modified silicone oil and dried to volatilize a solvent. The solvent may include anything such as a carbonate-based solvent (dimethylcarbonate, diethylcarbonate, and the like) used as a battery electrolyte solution, acetone, ether, alcohol, and the like, if it can dissolve the polyether-modified silicone oil. However, since the solvent can possibly remain after drying process, it may include a battery electrolyte solution. In addition, it may include a non-volatile solvent having a high boiling point, since it is easy to handle.

According to one embodiment of the present invention, polyether-modified silicone oil can be prepared by reacting poly siloxane, in which hydrogen is substituted for a part of an alkyl, with a polyether compound including a double bond, for example, $(CH_2=CH-)$.

The polyether-modified silicone oil prepared in the above method may include platinum (Pt) as a catalyst component and butylated hydroxy toluene (BHT) as a polymerization inhibitor in several to scores of ppm. However, since the Pt or BHT may have bad influences on cycle characteristics, it should be removed as much as possible. In the present invention, Pt may be included in polyether-modified silicone oil in an amount of less than 5 ppm, and BHT in an amount of less than 60 ppm. Both of them may be respectively included in an amount of less than a detecting limit.

According to one embodiment of the present invention, since a separator is coated with an antistatic agent, it may have excellent antistatic characteristics. Accordingly, since impurities or dust may not be absorbed in the separator of the present invention, and also, it may not stick to a worker or a machine during the manufacturing process, it is easy to handle.

In particular, when the polyether modified silicone oil is used as an antistatic agent, it may very efficiently prevent static electricity. Therefore, even when a separator is formed of a polymer porous film easily generating static electricity, the separator can be prevented from generating static electricity.

Positive Electrode

The positive electrode includes a positive active mass including a positive active material, a conductive agent, and a binder; and a positive current collector on which the positive active mass is disposed. The positive active mass may be formed in a disk-shape to fabricate a pellet-shaped or sheet-shaped electrode.

The positive active material may be a material that can reversibly intercalate and deintercalate lithium such as a Li-containing compound, oxide, sulfide, and so on. The positive active material may include at least one selected from the group consisting of Mn, Co, Ni, Fe, Al, and combinations thereof. Examples of the positive active material include $LiMn_2O_4$, $LiCoO_2$, $LiNiO_2$, $LiFeO_2$, $LiNi_{1/3}Co_{1/3}Mn_{1/3}O_2$, $LiNi_{0.8}Co_{0.2}O_2$, and so on. The binder may include polyvinylidene fluoride, polytetrafluoro ethylene, and so on. The conductive agent may include carbon such as carbon black, ketjen black, graphite, and so on. The positive current collector may include a metal foil or a metal net formed of aluminum, stainless steel, and so on.

Negative Electrode

The negative electrode includes a negative active mass including a negative active material, a conductive agent, and a binder; and a negative current collector on which the negative active mass is disposed. The negative active mass may be formed in a disk-shape to fabricate a pellet-shaped or sheet-shaped electrode.

The binder for the negative electrode may be any organic or inorganic material that can be dispersed or dissolved in a solvent along with the negative active material and bind the negative active material after solvent removal. Further, the binder may be a material that can bind the negative active material by mixing the negative active material and then press-forming. The binder may be selected from the group consisting of a vinyl-based resin, a cellulose-based resin, a phenol resin, a thermoplastic resin, a thermosetting resin, and so on. Specifically, the binder may be polyvinylidene fluoride, polyvinyl alcohol, carboxylmethyl cellulose, styrene butadiene rubber, and so on.

The negative electrode may further includes a conductive agent such as carbon black, a graphite powder, a carbon fiber, a metal powder, a metal fiber, and so on, besides the negative active material and binder.

The negative current collector may include a metal foil or a metal net formed of copper.

The negative active material may include a carbonaceous material such as artificial graphite, natural graphite, graphitizible carbon fiber, graphitizible mesocarbon microbeads, amorphous carbon, and so on. Further, the negative active material may be a metallic compound being capable of alloying lithium, or a composite material including the metallic compound and a carbonaceous material. A metal being capable of alloying lithium includes Si, Al, Sn, Pb, Zn, Bi, In, Mg, Ga, Cd, a Si alloy, a Sn alloy, or an Al alloy. For the negative active material, metal lithium thin film may also be used.

Non-Aqueous Electrolyte

The non-aqueous electrolyte is an organic electrolyte solution including an aprotic solvent and a lithium salt dissolved therein.

The aprotic solvent includes propylene carbonate, ethylene carbonate, butylene carbonate, benzo nitrile, aceto nitrile, tetrahydrofuran, 2-methyltetrahydrofuran, γ-butyrolactone, dioxolan, 4-methyl dioxolan, N,N-dimethylformamide, dimethyl acetamide, dimethyl sulfoxide, dioxane, 1,2-dimethoxyethane, sulfolane, dichloro ethane, chloro benzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, dimethyl ether, and so on. The aprotic solvent may be in combination. According to one embodiment, the aprotic solvent may essentially includes at least one of propylene carbonate (PC), ethylene carbonate (EC), and butylene carbonate (BC); and at least one of dimethyl carbonate (DMC), methylethyl carbonate (MEC), and diethylcarbonate (DEC).

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$, where x and y are integers, LiCl, LiI, and combinations thereof. According to one embodiment, $LiPF_6$ may be suitable for the lithium salt.

Alternatively, a polymer electrolyte may also be used. The polymer electrolyte includes a polymer such as PEO, PVA, and so on and the above lithium salt, or includes a polymer having a good swelling property in which an organic electrolyte solution is impregnated instead of the aforementioned non-aqueous electrolyte solution.

In a rechargeable lithium battery according to one embodiment of the present invention, an antistatic agent coated on a separator is assumed to partly move into a non-aqueous electrolyte. In other words, the polyether-modified silicone oil coated on the separator is assumed to be gradually diffused into a non-aqueous electrolyte. Then, the polyether modified silicone oil included in the non-aqueous electrolyte plays a role of suppressing decomposition of the non-aqueous electrolyte accompanied to charge and discharge cycles and deterioration of the non-aqueous electrolyte. Accordingly, a rechargeable lithium battery including a separator coated with polyether-modified silicone oil can have more excellent cycle characteristics than one including a separator not coated with polyether modified silicone oil.

In general, when a negative active material including Si is used, a rechargeable lithium battery including it may have bigger capacity than one including a negative active material including graphite but have a problem of cycle characteristic deterioration. However, a rechargeable lithium battery of the present invention can not only have improved cycle characteristics as aforementioned but also have high-capacity since it includes a negative active material including Si.

According to one embodiment of the present invention, a rechargeable lithium battery includes a separator coated with an antistatic agent and thereby, may not have a short circuit due to impurities or dust absorbed in the separator, improving reliability of a battery.

A rechargeable lithium battery according to one embodiment of the present invention is fabricated as follows.

First, a positive electrode, a negative electrode, a non-aqueous electrolyte, and separator are prepared respectively and then are assembled.

The positive electrode is fabricated as follows: a positive electrode slurry is prepared by mixing a positive active material, a conductive agent, and a binder in a solvent such as N-methyl-2-pyrrolidone, the positive electrode slurry is coated on a current collector, and dried to volatilize the solvent.

The negative electrode is fabricated as follows: a negative electrode slurry is prepared by mixing a negative active material, a conductive agent, and a binder in a solvent such as N-methyl-2-pyrrolidone, the negative electrode slurry is coated on a current collector, and dried to volatilize the solvent.

The non-aqueous electrolyte is prepared by dissolving a lithium salt in a aprotic solvent.

The separator may be prepared according to the above described method, for example a method for impregnating a polyether modified silicone oil as an antistatic agent in a polymer porous film.

A separator is interposed between the above fabricated positive and negative electrodes, is housed in a battery case, then electrolyte is injected followed by sealing the battery case to fabricate a rechargeable lithium battery.

Therefore, the present invention can provide an efficient method of manufacturing a rechargeable lithium battery by coating polyether-modified silicone oil on a separator to improve its antistatic characteristics. Since the separator may not stick to a worker or a machine, and also, impurities or dust may not be absorbed in the separator, it is easy to handle.

The following examples illustrate the present invention in more detail. However, it is understood that the present invention is not limited by these examples.

Example 1

A counter electrode shaped of a 200μ-thick sheet was fabricated by using a thin Li film.

On the other hand, a negative active material was prepared by using graphite including 10 mass % of Si. In addition, a binder was prepared by using polyvinylidene fluoride. The prepared negative active material, the binder, and N-methyl-2-pyrrolidone were mixed to prepare a negative electrode slurry. The prepared negative electrode slurry was coated on a 20 μm-thick Cu film and thereafter, dried to prepare a working electrode.

Next, ethylenecarbonate (EC) and diethylcarbonate (DEC) were mixed in a ratio of 30:70 to prepare a mixed solvent. $LiPF_6$ was added to the mixed solvent in a concentration of 1.3 mol/L, preparing a non-aqueous electrolyte.

Then, polyether-modified silicone oil, which was a compound represented by the following formula 6, was added to a dimethylcarbonate (DMC) solvent to prepare 30 mass % of a silicon solution.

The silicon solution was used to dip a 20 μm-thick porous polymer film formed of a polypropylene material for one minute and thereafter, dried with hot wind in an oven set at 60° C. to volatilize the solvent, preparing a separator. Herein, the separator was coated with polyether-modified silicone oil in an amount of 2.2 g per 1 $m^2$ of a porous polymer film.

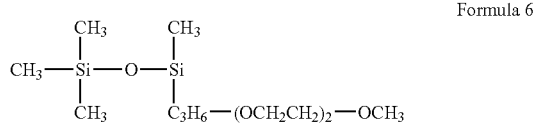

Formula 6

Then, the counter and working electrodes were cut out into a disk shape inside an Ar glove box in which moisture was regulated less than 1 ppm. The separator was interposed between the counter and working electrodes and thereafter, inserted in a case. Then, an electrolyte was injected in the case. Then, the case was sealed and closed, fabricating a coin-typed rechargeable lithium battery cell for a test.

Example 2

Another rechargeable lithium battery cell of Example 2 was fabricated in the same method as Example 1 except that polyether-modified silicone oil represented by the following formula 7 instead of the one used in Example 1 was used to prepare a separator.

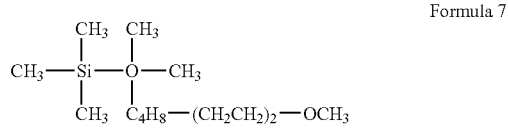

Formula 7

COMPARATIVE EXAMPLE 1

A coin-typed rechargeable lithium battery cell of Comparative Example 1 was fabricated in the same method as Example 1 except for using a porous polymer film not dipped in polyether-modified silicone oil.

Then, rechargeable lithium battery cells according to Examples 1 and 2 and Comparative Example 1 were charged at 0.1 C for 10 hours, then, stops for 30 minutes, and discharged at 0.1 C under a constant current up to a cut-off voltage of 1.5V. These charge and discharge were repeated for 40 cycles. The result was provided in FIG. 2.

Figure 2:
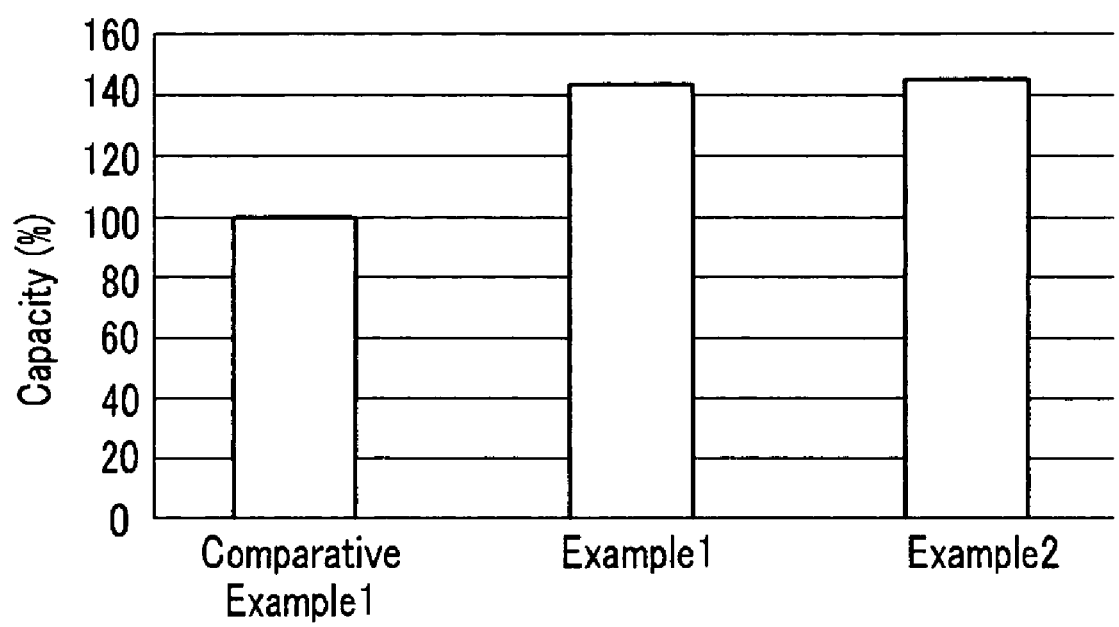
FIG. 2 shows discharge capacity of rechargeable lithium battery cells according to Examples 1 and 2 and Comparative Example 1.

FIG. 2 is a graph showing discharge capacity of the rechargeable lithium battery cells. On the other hand, the discharge capacity in FIG. 2 was based on that (100%) of the battery cell according to Comparative Example 1 after the battery cell was charged and discharged for 40 times.

As shown in FIG. 2, the rechargeable lithium battery cells of Examples 1 and 2 turned out to have higher capacity than the rechargeable lithium battery cell of Comparative Example 1. The reason was that separators of Examples 1 and 2 were coated with polyether-modified silicone oil, which can suppress decomposition of a non-aqueous electrolyte.

In addition, each separator used in Examples 1 and 2 and Comparative Example 1 was measured regarding the amount of static electricity. The amount of static electricity was measure by using a static electricity measurement sensor (ZJ-SD Series Smart Electronic Sensor) made by Omron Electronics Pte Ltd.

Figure 3:
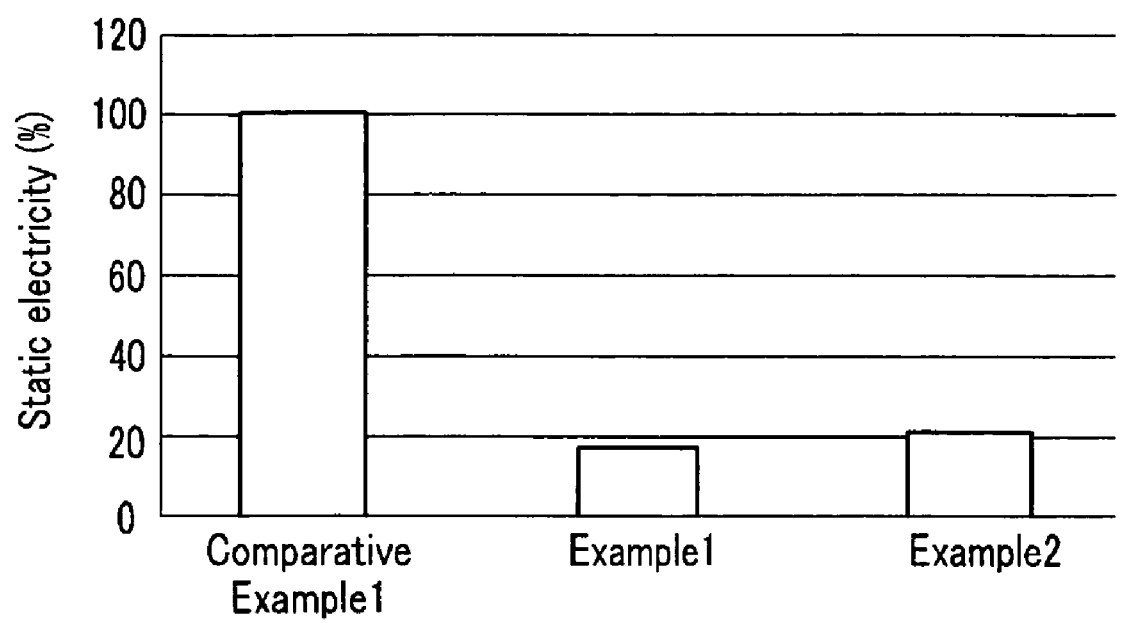
FIG. 3 shows static electricity of separators according to Examples 1 and 2 and Comparative Example 1.

The result was provided in FIG. 3. On the other hand, the amount of static electricity of a separator according to Examples 1 and 2 was calculated based on that of a separator according to Comparative Example 1 as 100%.

As shown in FIG. 3, the separators according to Examples 1 and 2 had ⅕ reduced amount of static electricity compared with that of the separator according to Comparative Example 1. The reason is that the separators according to Examples 1 and 2 were coated with polyether-modified silicone oil and thereby, suppressed from static electricity.

Therefore, since a separator of the present invention is coated with an antistatic agent, it can have excellent antistatic characteristics. In addition, it is easy to handle a separator of the present invention, because impurities or dust is not absorbed in the separator, but also the separator does not stick to a worker or a machine.

Furthermore, since a rechargeable lithium battery of the present invention includes a separator coated with an antistatic agent, it may not have a short circuit due to impurities or dust absorbed in the separator, having improved reliability.

Besides, the present invention can provide an efficient method of manufacturing a rechargeable lithium battery by coating a separator with an antistatic agent, so that the separator may not stick to a worker or a machine.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A separator for a rechargeable lithium battery, comprising:
   a separating substrate; and
   an antistatic agent coated on the separating substrate, the antistatic agent comprising polyether-modified silicone oil selected from the group consisting of the compounds represented by the following formulas 1 to 5 and combinations thereof:

Formula 1

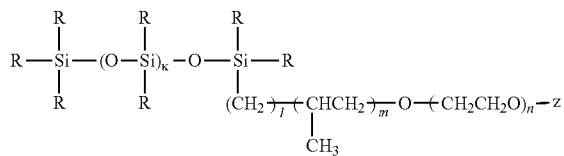

where, in the above formula 1, k ranges from 1 to 9, l ranges 0 to 3, m is 1, n ranges from 1 to 2, R is either of $CH_3$ or $C_6H_5$, and z is either of $CH_3$ or $C_2H_5$;

Formula 2

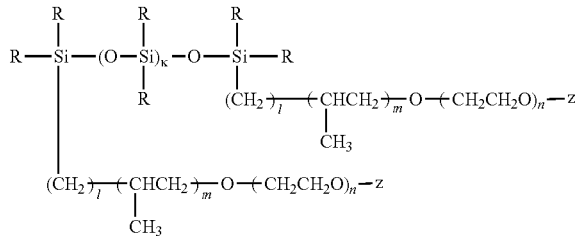

where, in the above formula 2, k ranges from 1 to 9, l ranges 0 to 3, m is 1, n ranges from 1 to 2, R is either of $CH_3$ or $C_6H_5$, and z is either of $CH_3$ or $C_2H_5$;

Formula 3

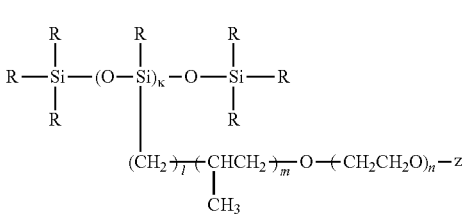

where, in the above formula 3, k ranges from 1 to 9, l ranges 0 to 3, m is 1, n ranges from 1 to 2, R is $C_6H_5$, and z is either of $CH_3$ or $C_2H_5$;

Formula 4

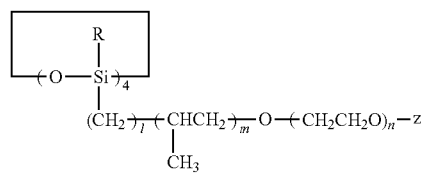

where, in the above formula 4, k ranges from 1 to 9, l ranges 0 to 3, m is 1, n ranges from 1 to 2, R is either of $CH_3$ or $C_6H_5$, and z is either of $CH_3$ or $C_2H_5$;

Formula 5

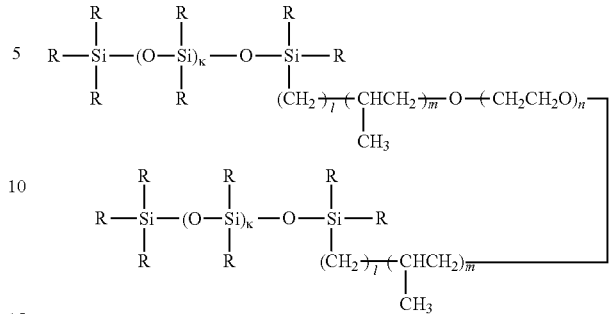

where, in the above formula 5, k ranges from 1 to 9, l ranges 0 to 3, m ranges from 0 to 1, n ranges from 1 to 2, R is either of $CH_3$ or $C_6H_5$, and z is either of $CH_3$ or $C_2H_5$.

2. The separator of claim 1, with the separating substrate comprising a polymer porous film.

3. The separator of claim 2, comprised of the polyether-modified silicone oil being present in an amount ranging 0.3 g to 5.0 g per 1 $m^2$ of the polymer porous film.

4. A rechargeable lithium battery, comprising:

a positive electrode including a positive active material;

a negative electrode including a negative active material;

a separator interposed between the positive and negative electrodes, the separator coated with an antistatic agent, the antistatic agent comprising polyether-modified silicone oil selected from the group consisting of the compounds represented by the following formulas 1 to 5 and combinations thereof:

Formula 1

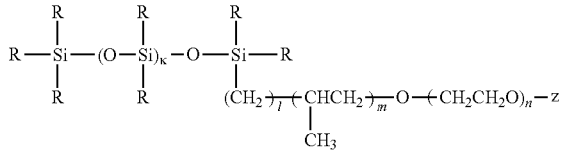

where, in the above formula 1, k ranges from 1 to 9, l ranges 0 to 3, m is 1, n ranges from 1 to 2, R is either of $CH_3$ or $C_6H_5$, and z is either of $CH_3$ or $C_2H_5$;

Formula 2

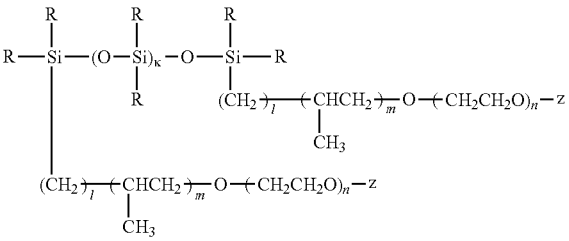

where, in the above formula 2, k ranges from 1 to 9, l ranges 0 to 3, m is 1, n ranges from 1 to 2, R is either of $CH_3$ or $C_6H_5$, and z is either of $CH_3$ or $C_2H_5$;

Formula 3

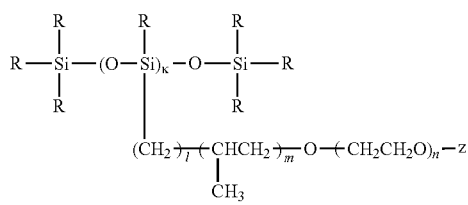

where, in the above formula 3, k ranges from 1 to 9, l ranges 0 to 3, m is 1, n ranges from 1 to 2, R is $C_6H_5$, and z is either of $CH_3$ or $C_2H_5$;

Formula 4

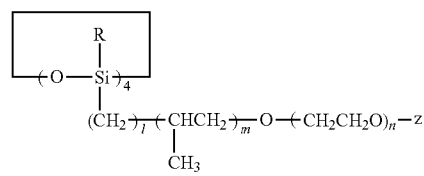

where, in the above formula 4, k ranges from 1 to 9, l ranges 0 to 3, m is 1, n ranges from 1 to 2, R is either of $CH_3$ or $C_6H_5$, and z is either of $CH_3$ or $C_2H_5$;

Fromula 5

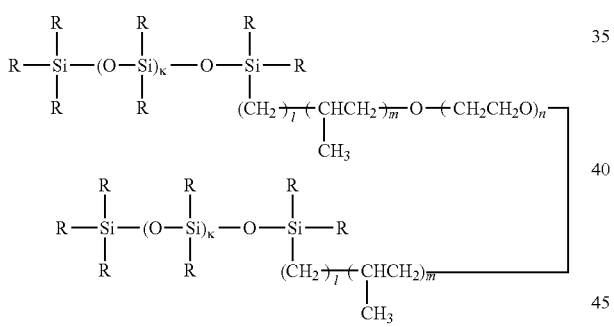

where, in the above formula 5, k ranges from 1 to 9, l ranges 0 to 3, m ranges from 0 to 1, n ranges from 1 to 2, R is either of $CH_3$ or $C_6H_5$, and z is either of $CH_3$ or $C_2H_5$; and a non-aqueous electrolyte.

5. A method of manufacturing a rechargeable lithium battery, comprised of:
preparing a positive electrode including a positive active material, a negative electrode including a negative active material, a separating substrate, and a non-aqueous electrolyte;
preparing a separator by coating the separating substrate with an antistatic agent, the antistatic agent comprising polyether-modified silicone oil selected from the group consisting of the compounds represented by the following formulas 1 to 5 and combinations thereof:

Formula 1

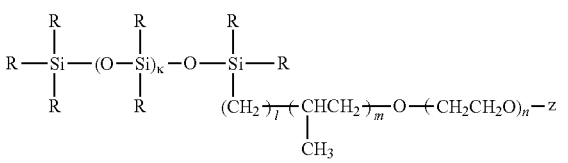

where, in the above formula 1, k ranges from 1 to 9, l ranges 0 to 3, m ranges from 0 to 1, n ranges from 1 to 2, R is either of $CH_3$ or $C_6H_5$, and z is either of $CH_3$ or $C_2H_5$;

Formula 2

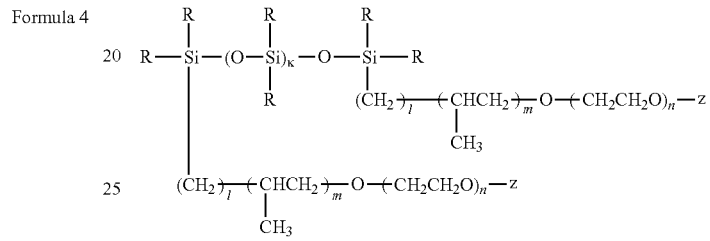

where, in the above formula 2, k ranges from 1 to 9, l ranges 0 to 3, m ranges from 0 to 1, n ranges from 1 to 2, R is either of $CH_3$ or $C_6H_5$, and z is either of $CH_3$ or $C_2H_5$;

Formula 3

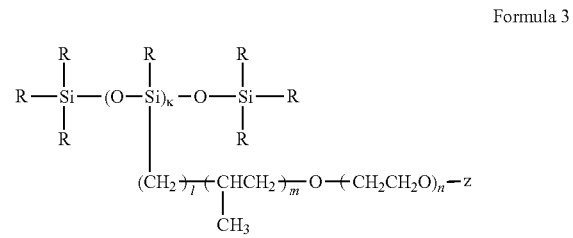

where, in the above formula 3, k ranges from 1 to 9, l ranges 0 to 3, m ranges from 0 to 1, n ranges from 1 to 2, R is $C_6H_5$, and z is either of $CH_3$ or $C_2H_5$;

Formula 4

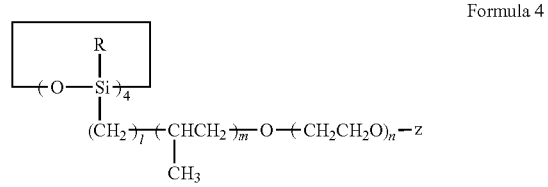

where, in the above formula 4, k ranges from 1 to 9, l ranges 0 to 3, m ranges from 0 to 1, n ranges from 1 to 2, R is either of $CH_3$ or $C_6H_5$, and z is either of $CH_3$ or $C_2H_5$;

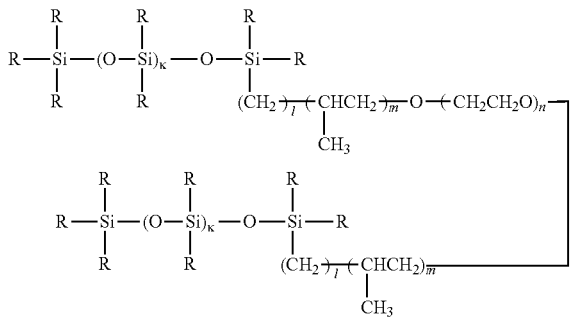

Formula 5 where, in the above formula 5, k ranges from 1 to 9, l ranges 0 to 3, m ranges from 0 to 1, n ranges from 1 to 2, R is either of $CH_3$ or $C_6H_5$, and z is either of $CH_3$ or $C_2H_5$;

interposing the prepared separator between the positive and negative electrodes; and providing the non-aqueous electrolyte, after the interposition of the prepared separator, to manufacture the rechargeable lithium battery.

6. The method of claim 5, comprised of the separator being fabricated by impregnating the antistatic agent in the separating substrate.

7. The separator of claim 1, wherein the polyether-modified silicone oil is the compound represented by the formula 1.

8. The separator of claim 1, wherein the polyether-modified silicone oil is the compound represented by the formula 2.

9. The separator of claim 1, wherein the polyether-modified silicone oil is the compound represented by the formula 4.

10. The separator of claim 1, wherein the polyether-modified silicone oil is the compound represented by the formula 5.

11. The rechargeable lithium battery of claim 4, wherein the polyether-modified silicone oil is the compound represented by the formula 1.

12. The rechargeable lithium battery of claim 4, wherein the polyether-modified silicone oil is the compound represented by the formula 2.

13. The rechargeable lithium battery of claim 4, wherein the polyether-modified silicone oil is the compound represented by the formula 4.

14. The rechargeable lithium battery of claim 4, wherein the polyether-modified silicone oil is the compound represented by the formula 5.

15. The method of claim 5, wherein the polyether-modified silicone oil is the compound represented by the formula 1.

16. The method of claim 5, wherein the polyether-modified silicone oil is the compound represented by the formula 2.

17. The method of claim 5, wherein the polyether-modified silicone oil is the compound represented by the formula 4.

18. The method of claim 5, wherein the polyether-modified silicone oil is the compound represented by the formula 5.

* * * * *